Dec. 9, 1969   H. I. PARDES ETAL   3,483,556
TARGET LOCATION COORDINATE ENCODING TECHNIQUE
Filed June 26, 1968   2 Sheets-Sheet 2
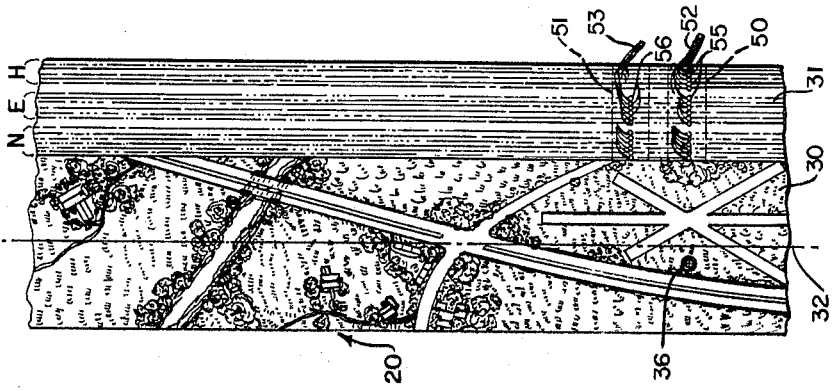
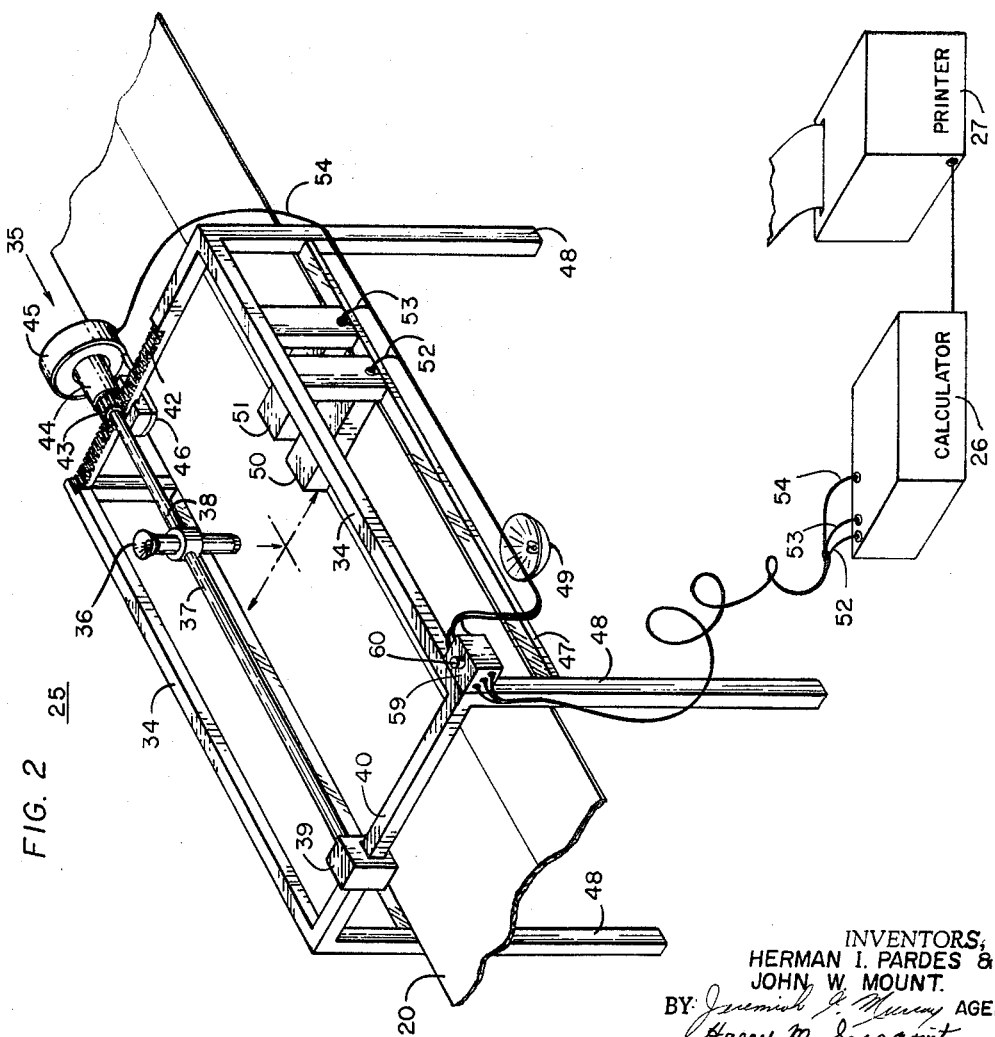
INVENTORS,
HERMAN I. PARDES &
JOHN W. MOUNT.
BY Jeremiah J. Murray AGENT.
Harry M. Saragovitz,
Edward J. Kelly &
Herbert Berl
ATTORNEYS.

United States Patent Office 3,483,556
Patented Dec. 9, 1969

3,483,556
TARGET LOCATION COORDINATE ENCODING TECHNIQUE
Herman I. Pardes, Wanamassa, and John W. Mount, Long Branch, N.J., assignors to the United States of America as represented by the Secretary of the Army
Filed June 26, 1968, Ser. No. 740,139
Int. Cl. G01s 9/02
U.S. Cl. 343—6         9 Claims

ABSTRACT OF THE DISCLOSURE

An airborne line scanning mapping system transmits video information to a receiver which displays the information on a CRT. A radar system continuously tracks the aircraft and supplies in coded form the coordinates and altitude of the aircraft to the CRT. The transmitted video information and the radar information are displayed side by side during each horizontal sweep of the CRT. A film is passed in front of the CRT to form a continuous strip map with the coordinate and altitude information of the aircraft adjacent to the map. The film, after being processed, is passed through a reader which in turn provides input information to a calculator. After receiving from the reader the altitude and coordinates of the aircraft, which corresponds to a particular line on the map, and from the scanning characteristics of the airborne scanner, the calculator can calculate the coordinates of a particular object on that line.

---

The invention described herein may be manufactured, used, and licensed by or for the Government for governmental purposes without the payment to us of any royalty thereon.

The present invention relates to an object locating system and more particularly to a system for automatically reading the coordinates of targets from a map.

In the field of airborne reconnaissance, it has been the general practice to produce aerial maps by photographic means. Obtaining the coordinates of objects located on such photographs are usually accomplished by measuring the distance of the object from a reference point on the photograph the coordinates of which have been previously determined by recording the coordinates and altitude of the aircraft at the time the picture was taken. With the recent advent of line scan mapping, which may be accomplished by airborne radar systems, IR sensors, or the like, the resulting map in the form of a strip is continuously recorded as the aircraft is moving. It has been found that the previous methods of determining coordinates on such strip maps is cumbersome, slow, and inaccurate. Of course, in line scan mapping the coordinates and altitude of the aircraft are constantly changing as the aircraft is moving and likewise as the map is being reconstructed line by line. Therefore, the scale of the map will vary from place to place as a result of the changes in altitude of the aircraft, and since the aircraft will usually be flying a torturous ground path, the distance between objects cannot always be measured on the map with a straight edge.

The general purpose of this invention is to provide an object locating system which can automatically determine the coordinates of objects when viewed on the map by an interpreter. Information related to the coordinates and altitude of the aircraft is continuously recorded on the film strip as the map is constructed. Reading the coordinates of specific objects would be performed automatically by manually placing a cursor over the object in question and energizing a calculator which would detect the aircraft coordinates and altitude information from the edge of the map and also detect the position of the cursor relative to a fixed reference. From this information, the coordinates of the object are then calculated and recorded or otherwise provided as an output.

The exact nature of this invention will be readily apparent from consideration of the following specification relating to the annexed drawing in which:

FIGURE 2 illustrates in detail a portion of the device shown in FIGURE 1; and

FIGURE 3 illustrates a pictorial representation of a portion of the map.

Figure 1:
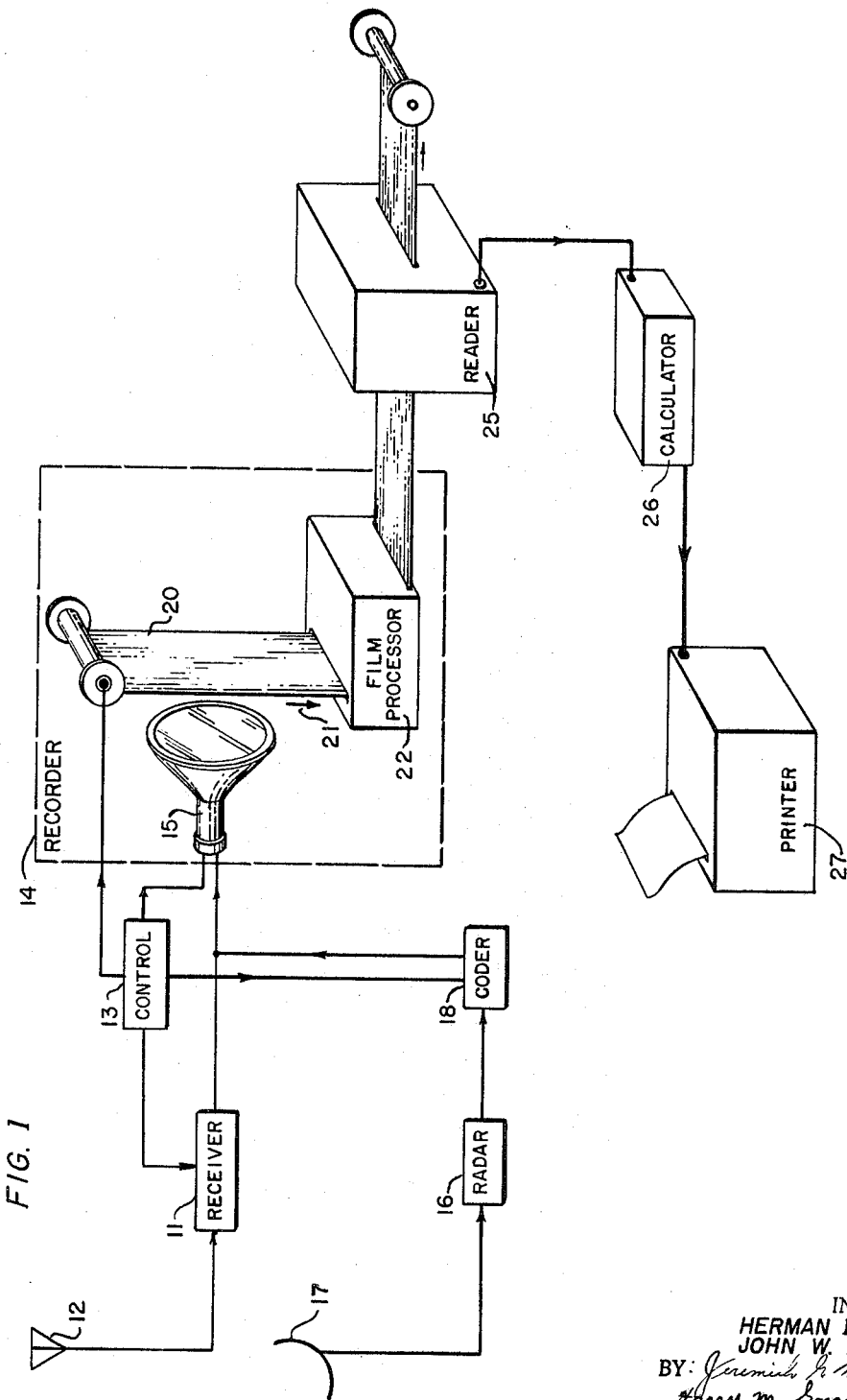
FIGURE 1 shows a schematic block diagram of a preferred embodiment of the invention.

Referring now to the drawings, wherein like reference characters designate like or corresponding parts throughout the several views, there is shown in FIGURE 1 a video receiver 11 for receiving via antenna 12 video signals which are broadcast by a reconnaissance aircraft. The video signals would be the result of information obtained by scanning the terrain a line at a time and in a direction perpendicular to the ground path. The scanning process would normally be accomplished by a line scanner such as a radar system or an IR detector system located in the aircraft. Of course, any system which can scan terrain and convert the terrain characteristics into an electronic signal could be used.

The received video signals are then processed by receiver 11 and under the control of control 13 are applied to a photographic recorder 14 having a parallel display device such as CRT 15 the intensity of which is varied in accordance with the video signal. Control 13 provides the horizontal sweep signal to CRT 15 to synchronize the sweep period with the scanning period of the airborne line scanner. As the beam in CRT 15 is horizontally swept, the intensity of the beam is modulated by receiver 11.

A radar system 16 having a directional antenna 17 is also provided for tracking the aircraft containing the line scanner to determine the coordinates and altitude of the aircraft. This information is then put into a binary coded form by coder 18 and under the control of control 13 is also applied to the CRT 15 to intensity modulate the beam.

The information displayed on CRT 15 will, therefore, consist of the characteristics of the terrain scanned by the aircraft and the location of the aircraft when the terrain was scanned. As stated earlier, the terrain characteristics will be displayed a line at a time by varying the intensity of the CRT beam. The location of the aircraft will be displayed on the CRT 15 in binary coded form as a series of high intensity marks or spaces. The control 13 would present the coded information to the CRT 15 for a portion of the horizontal sweep period and present the mapping information from receiver 11 for the remainder of the sweep period. For example, if twelve binary bits are used to code each of the three location components, then for a portion of each horizontal sweep of CRT 15 a series of thirty-six marks or spaces will be displayed with the remainder of the sweep being devoted to displaying the information to be mapped.

Recorder 14 also includes a supply of film 20 upon which is focused the display screen of the CRT 15. The supply of film 20 is intermittently advanced or fed, under the influence of control 13, in the direction of arrow 21 and in synchronization with the sweep period of CRT 15 such that the CRT traces will be successively exposed onto adjacent areas of film 20 to construct a strip map as shown in FIGURE 3. Also as seen in FIGURE 3, the coded information will appear as a series of broken parallel lines, since adjacent marks will merge as the film progresses. The film 20 after exposure is fed through a film processor 22 which develops the images thereon. For simplicity, the recorder 14 is shown schematically and would in reality contain a number of additional elements such as an optical system for focusing the CRT image onto film 20. Such recorders, however, are generally well-known and it is therefore not shown in greater detail. In the present example, for reasons which will later become evident, the film 20 is preferably of the type which produces a positive image of variable transparency. Receiver 11, radar 16, and coder 18 are in general well-known devices and can be easily adapted to perform the functions indicated. The design of control 13, which may include a clock or timing means and additional logic circuits for generating the required control functions, is also well within the state-of-the-art and is therefore not shown in detail.

The film 20, upon exit from recorder 14, will contain a visible image in the form of a strip map 30 with a series of lines 31 adjacent thereto, which contain the coded information of the aircraft location, as shown in FIGURE 3. The film 20 is then passed through a reader 25 which may be operated by an interpreter. The reader, when operated by the interpreter, will provide coordinate information in coded form to calculator 26 which will then calculate the coordinates of the object in question and provided an input to a recorder such as printer 27 which in turn will print out the coordinates of the object.

In order to compute the coordinates of an object, all that is required is the location of the object on the map, the location of the aircraft with respect to the terrain at the time the terrain scanned the object in question, and the direction of the ground path. For purposes of this discussion, let it be assumed that the airborne line-scanner is arranged such that the terrain is scanned through a constant angle on equal sides of the ground path and perpendicular thereto. As a result of this assumption, the ground path on the map will be a straight line extending along the center of the map as indicated by dotted line 32 (FIG. 3). Of course, the ground path could be located at some other position on the map or even off the map as would usually be the case if a side-looking radar were used. However, it is important that the location of the ground path be known since in effect it is the longitude and latitude of this ground path which is coded onto the side of the film 20. Also, the ground path 32 will be a straight line on the map even though the aircraft may have flown a curved course, because the scanning takes place on equal sides of the ground path.

Reader 25 includes a frame 41 having four legs 48 which support a cross bar 40, a rack 42, and a pair of side bars 34. Also supported by legs 48 is a platform 47 made of diffusion glass. A light source 49 is placed beneath platform 47 for illuminating the platform 47. A cursor 35 includes an eyepiece 36 supported by a pair of arms 37 and 38. Arm 37 terminates in a slidable collar 39 which slidably mates with crossbar 40. Arm 38 terminates in a bearing in pinion gear 43 which in turn mates with rack 42. A shaft 44 is connected to gear 43 and rotates therewith and extends into the housing of an encoder 45. An arm 46, extending from the housing of encoder 45, slidably mates with the underside of rack 42 to prevent rotation of the housing. The encoder 45 which is not shown in detail could be any of the well-known types of disc coders or counters which are used to encode the amount of angular rotation of a shaft from some reference. Suspended from side bar 34 are a pair of photoelectric detector devices 50 and 51. Each of these devices 50 and 51 contain a series of photodetectors 55 and 56 (FIGURE 3) and are suspended above platform 47 with sufficient clearance for film 20 to pass therebetween. A bundle of conductors 54 is connected from encoder 45 to a calculator 26 via a manual switch 59. Bundles of conductors 52 and 53 are connected from devices 50 and 51 respectively to calculator 26 via manual switch 59. Switch 59 which is normally open includes a finger piece 60 which when depressed completes the connections from the encoder and devices 50 and 51 to the calculator 26.

Platform 47 and cursor 35 are mounted such that eyepiece 36 moves along a line which is parallel to the surface of platform 47 and is perpendicular to side bar 34. The photodetectors 55 in device 50 lie along a line which is directly below the line of movement of the eyepiece 36 and parallel thereto. The photodetectors 56 located in device 51 lie along a line which is parallel to the line of detectors 55. Detectors 55 and 56 will detect light passing through that portion of film 20 which is immediately below the detectors.

A map interpreter when attempting to locate objects would first view the film as it slowly passed over the platform 47 to generally find potential objects. After spotting an object on the film he would then place the eyepiece 36 directly over the object and simultaneously press the button 60 to provide input information to the calculator 26 via conductors 52, 53, and 54.

Calculator 26 would be constructed such that from the input information provided on conductors 52, 53 and 54, the coordinates of the object in question would be calculated and then provided as an input to printer 27. The calculations required of calculator 26 involve relatively elementary algebraic and trignometric calculations.

For example, let it be assumed as was discussed previously that the airborne line scanner scans the terrain through a total angle of say 60 degrees and along a line which is perpendicular to the ground path of the aircraft. Also, it is assumed that the scanner scans straight down and on equal sides of the ground path. Therefore, the aircraft would always be located somewhere on line 32 of strip map 30. The actual perpendicular distance from an object to the ground path may be calculated by calculator 26 from the altitude information, the location of eyepiece 36 (when placed over the object) and from the scanning angle. For example if an object is located, on strip map 30, half way between line 32 and the edge of map 30, and since the scanner scans through a 60 degree angle, i.e. 30 degrees on each side of line 32, then the angle between a line which includes the aircraft and is perpendicular to line 32, i.e. the altitude, and a straight line which includes both the object in question and the aircraft will be 15 degrees. Therefore, the distance from the ground path to the object will simply be the altitude of the aircraft times the tangent of 15 degrees.

The orientation of the ground path may be substantially determined from the coordinates of the aircraft at the time the object was scanned and at a time just previous to that time. For example, let it be assumed that the coordinates of the point on line 32 directly opposite the object, as provided by detectors 55, is located directly northwest of the coordinates as provided by detectors 56 (it is assumed that the aircraft is moving along line 32 in a direction from the top of map 30 to the bottom). Therefore, the calculator would then determine that the approximate ground path at the time the object was scanned was along a line which made an angle of 45 degrees with the meridian. If the object was located on the right side of line 32 as viewed on the map 30 of FIGURE 3 which is detected by encoder 45, then the calculator 26 would determine that the object in question was located directly southwest of the aircraft at the time the object was scanned. It is pointed out that the number of detectors 56 is less than the number of detectors 55 since only the coordinates of the aircraft and not the altitude are required to be detected by detectors 56.

Finally, in the present example, the calculator 26 would then provide an input to printer 27 which would be the coordinates of the point which is directly southwest of the coordinates provided by detectors 55 and a distance equal to the altitude of the aircraft, as provided by detectors 55, multiplied by the tangent of 15 degrees, which was provided by encoder 45. It is noted that the linear distance per degree latitude, is substantially constant over the surface of the Earth and that the linear distance per degree longitude is a function of the latitude. Therefore, in calculating the coordinates, of course, calculator 26 will have to take this fact into consideration. Devices to perform such calculations from binary inputs, however, are well within the state-of-the-art.

What is claimed is:

1. An object locating system for automatically determining the location of objects from a display produced from information supplied by an airborne line scanner comprising; receiving means for receiving information transmitted from said airborne line scanner; tracking means for continuously tracking said line scanner and for providing the location information thereof; display means for displaying a reconstructed image of objects scanned by said line scanner and associated location information produced by said tracking means; reader means including means for manually selecting a particular object on said display; means for detecting the location information of said line scanner associated with said particular object, and means for detecting the relative position of said particular object on said display; and calculator means connected to said reader means for calculating the location of said particular object from said associated location information of said line scanner and from said relative position information of said particular object on said display.

2. The devices according to claim 1 and wherein said display means includes a supply of photographic film on which said image is formed.

3. The device according to claim 2 and wherein the images formed on said film are arranged in the form of a strip map and said location information on said film consists of a series of marks and spaces located adjacent said strip map.

4. The device according to claim 3 and wherein said means for manually selecting a particular object includes a manually moveable cursor for alignment over discrete objects on said film.

5. The device according to claim 4 and wherein said means for detecting the relative position of said particular object on said display includes a means for detecting the amount of movement of said cursor from a predetermined reference.

6. The device according to claim 3 and wherein said means for detecting location information includes a first detector means for detecting the information associated with the location of said line scanner at the time a particular object was scanned and a second detector means for detecting the location of said line scanner at a time which is slightly spaced from said first mentioned time.

7. The device according to claim 6 and wherein the images and information on said film is displayed in the form of a variable transparency; and said reader further comprising a light source means for passing light through said film.

8. The device according to claim 7 and wherein said first and second detector means includes means for detecting the amount of light passing through said film in the area containing the location information.

9. A photographic mapping system for producing a photographic record of information supplied by an airborne line scanner comprising; receiving means for receiving information transmitted from said airborne line scanner; radar tracking means for continuously tracking said line scanner and including output means for providing the location information of said line scanner; binary coder means connected to said output means of said radar means and for converting said location information into a binary code reresenting the longitude, latitude, and altitude of said line scanner; recorder means including a cathode ray tube and a supply of photographic film; said receiver means and said coder means connected to said cathode ray tube; control means controlling the outputs of said coder means, and said receiver means such that the information from a complete cycle of said line scanner and the location information associated therewith are displayed side by side on said cathode ray tube; and said control means connected to said supply of film for intermittently feeding said film past said cathode ray tube such that a continuous strip map of the area scanned by said line scanner and the associated location information of said line scanner are formed thereon.

References Cited

UNITED STATES PATENTS

| | | | |
|---|---|---|---|
| 2,995,740 | 8/1961 | Shreckengost | 343—6 X |
| 3,001,187 | 9/1961 | Hammond, Jr., et al. | 343—6 |
| 3,007,155 | 10/1961 | Petrides et al. | 343—6 |
| 3,274,589 | 9/1966 | Droege et al. | 343—6 |

RODNEY D. BENNETT, JR., Primary Examiner

M. F. HUBLER, Assistant Examiner